C. H. VEEDER.
INDICATOR FOR MAGAZINE GUNS.
APPLICATION FILED JAN. 21, 1919.
1,326,234.
Patented Dec. 30, 1919.
2 SHEETS—SHEET 1.
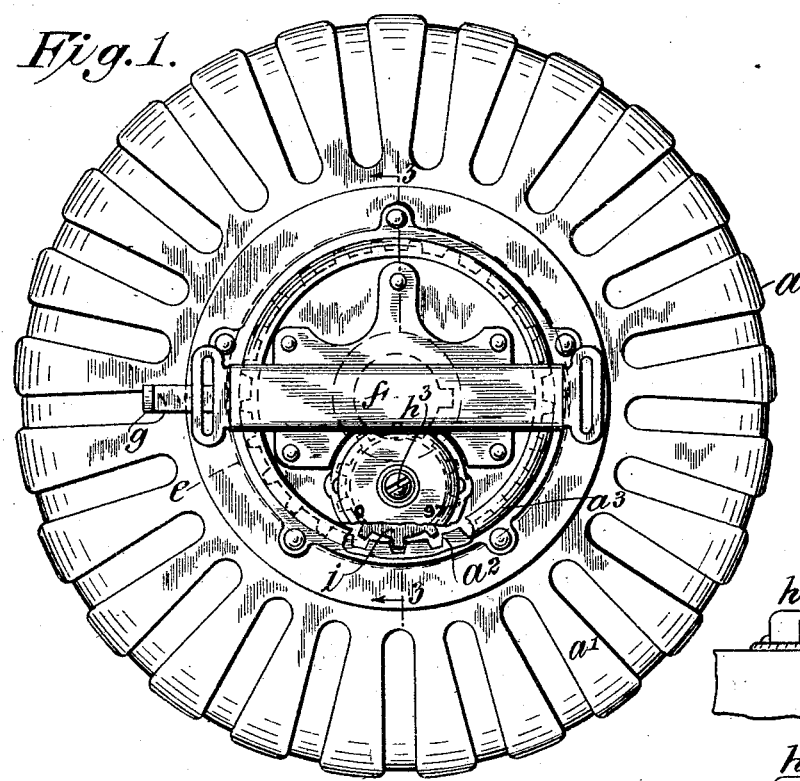
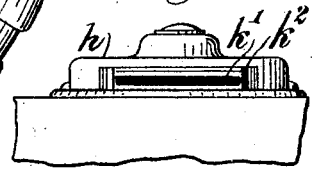
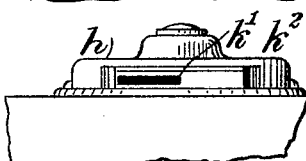
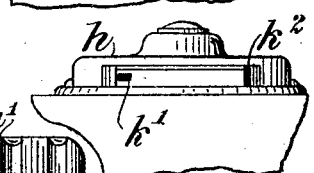
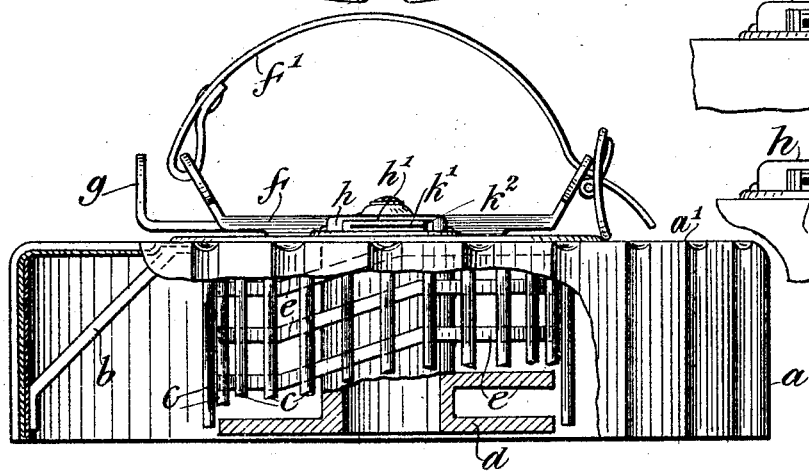
WITNESS
INVENTOR
Curtis Hussey Veeder
BY
Redding & Greeley
ATTORNEYS C. H. VEEDER.
INDICATOR FOR MAGAZINE GUNS.
APPLICATION FILED JAN. 21, 1919.
1,326,234.
Patented Dec. 30, 1919.
2 SHEETS—SHEET 2.
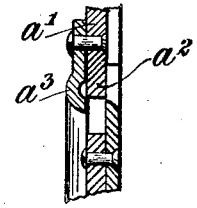
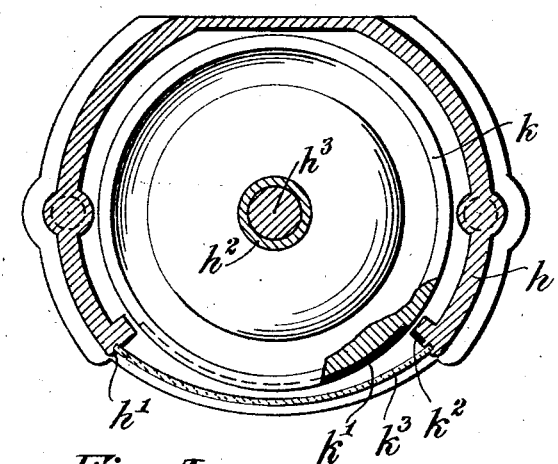
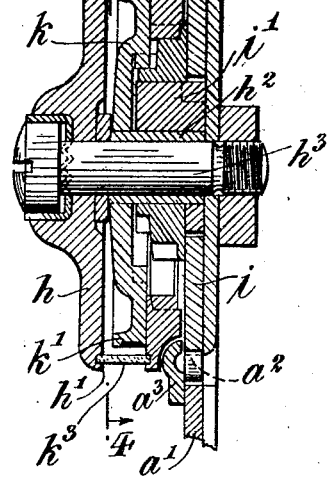
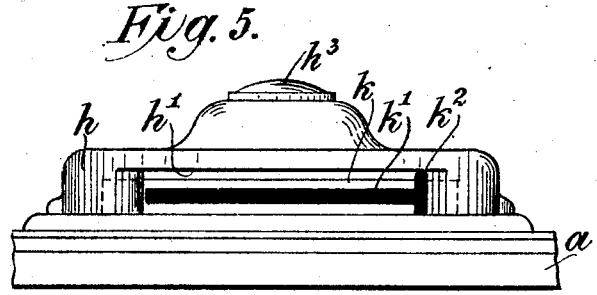
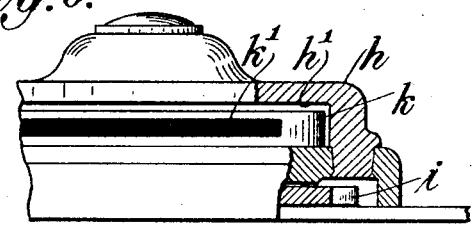
WITNESS
INVENTOR
Curtis Hussey Veeder
BY
Redding & Greeley
ATTORNEYS

UNITED STATES PATENT OFFICE.

CURTIS HUSSEY VEEDER, OF HARTFORD, CONNECTICUT.

INDICATOR FOR MAGAZINE-GUNS.

1,326,234.      Specification of Letters Patent.      Patented Dec. 30, 1919.

Application filed January 21, 1919. Serial No. 272,241.

*To all whom it may concern:*

Be it known that I, CURTIS HUSSEY VEEDER, a citizen of the United States, residing in the city of Hartford, in the State of Connecticut, have invented certain new and useful Improvements in Indicators for Magazine-Guns, of which the following is a specification, reference being had to the accompanying drawings, forming a part hereof.

In the operation, under conditions of actual warfare, of machine guns fed from magazines in which the cartridges are covered from sight, it is desirable that the operator have in range of vision something to indicate the approximate number of cartridges which remain in the magazine at any instant in order that preparations may be made for the quick substitution of a full magazine for an empty magazine. It is not essential that the precise number of cartridges which remain in the magazine be indicated to the operator, but it is sufficient if it is made known to him how nearly the cartridges are exhausted. It is particularly desirable, however, that the indication be such that it can be read instantly under all conditions, even at night as well as in the day time. It is the object of the present invention to provide an indicator which shall meet these requirements and in accordance therewith the indicator wheel, which is actuated by the movement of the magazine, is arranged within a casing provided with a sight window and bears a band or line of luminous compound, the whole of which is exposed through the window when the magazine is full, while the length of the exposed portion is progressively decreased during the operation of the gun until it disappears when the magazine is empty. The invention will be more fully explained hereinafter with reference to the accompanying drawings in which it is illustrated, and in which—

Figure 1 is a top view of a magazine for a Lewis machine gun with the indicator applied thereto, a portion of the top plate being broken out.

Fig. 2 is a view of the same in side elevation with portions of the casing and of the internal devices broken away.

Fig. 3 is a detail view in section on the plane indicated by the broken line 3—3 of Fig. 1, looking in the direction of the arrows, on a larger scale than that of Fig. 1.

Fig. 4 is a detail view in horizontal section on the plane indicated by the broken line 4—4 of Fig. 3, looking in the direction of the arrows.

Fig. 5 is a detail view of the indicator in elevation on the same scale as Fig. 3.

Fig. 6 is a partial view similar to Fig. 5 with a portion of the casing of the indicator in section.

Fig. 7 shows three views of the indicator with the indicator band in different positions.

The magazine to which the invention is shown to be applied in the present instance is the ordinary magazine of the well known Lewis machine gun, comprising a cylindrical casing $a$, with the obliquely disposed separating and guiding bars $b$ and the vertical separating and guiding pins $c$, a hub $d$ formed to fit upon the support provided therefor on the gun and to receive the casing $a$, and provided with a stepped spiral flange $e$, a carrying bar $f$ with a carrying strap $f'$, and a locking bar $g$ arranged to slide within the carrying bar $f$. All of these parts are arranged and operate in the usual manner. The casing $a$ is rotated upon the hub $d$ by any usual or suitable devices, not necessary to be shown or described.

In the embodiment of the invention illustrated, the top plate $a'$ of the casing is provided, about its central opening, with an internal gear $a^2$ and preferably has secured thereto also a ring $a^3$ which overlaps and covers the internal gear $a^2$.

On the top plate $d'$ of the hub $d$ is mounted the indicator which, in the construction shown, consists of a movable body, shown as a wheel $k$, mounted to move or rotate within a casing $h$ which has a side window $h'$. The casing $h$ is shown as having a central hub $h^2$ and as secured to the plate $d'$ by a bolt and nut $h^3$. Mounted loosely on the hub $h^2$ is a gear $i$ which meshes with the internal gear $a^2$ above described. The indicator wheel $k$ is mounted to rotate on the hub $h^2$ and is arranged to be driven from the gear $i$ through a reducing gear $i'$ of ordinary construction which engages operatively the indicator wheel $k$.

On the indicator wheel $k$ is formed a circumferential band $k'$ of any suitable luminous compound, the band and the window $h'$ being of equal length so that the whole of the band is visible through the window when the magazine is full. A luminous mark $k^2$ may also be provided on the casing $h$ at one end of the window $h'$.

In the operation of the invention as illustrated in the drawings the magazine casing $a$ receives, in the operation of the gun, a rotary movement through which the indicator wheel $k$ is rotated. The parts are so arranged that when the magazine is full the whole of the luminous band $k'$ shall be visible through the window $h'$. In the continued movement of the magazine the wheel is rotated so as to cause more and more of the luminous band $k'$ to be concealed within the casing, so that the approximate number of cartridges which remain in the magazine is indicated by the progressive shortening of the visible portion of the band. At night the band is visible by reason of its luminosity and in the day time it is visible by reason of the contrast in color between the band and the surface of the wheel on which it is laid. The luminous mark $k^2$, preferably formed on the end of the casing, within the glass front $k^3$, serves as a mark to catch the eye of the observer.

It will be obvious that various changes in details of construction and arrangement can be made to suit different conditions of use.

I claim as my invention:

The combination with a magazine for machine guns comprising a central supporting hub and a cartridge carrying casing mounted rotatably on the hub, of a cylindrical casing mounted on the hub and having a sight opening, an indicator wheel mounted rotatably within the casing and bearing a luminous band visible in whole or in part through the sight opening, and means operated by the rotation of the magazine casing on the hub to rotate the indicator wheel.

This specification signed this 18th day of January, A. D. 1919.

CURTIS HUSSEY VEEDER.